United States Patent [19]

Hedin et al.

[11] 4,184,184

[45] Jan. 15, 1980

[54] CARTRIDGE WITH IMPROVED ACCESS DOOR CLOSING MEANS

[75] Inventors: Roland C. Hedin, Mahtomedi; Lawrence R. Whitaker, Jr., St. Paul, both of Minn.

[73] Assignee: Minnesota Mining and Manufacturing Company, St. Paul, Minn.

[21] Appl. No.: 938,810

[22] Filed: Sep. 1, 1978

[51] Int. Cl.² ............................................... G11B 23/02
[52] U.S. Cl. ..................................................... 360/133
[58] Field of Search ............................ 360/133, 97–99; 206/444

[56] References Cited

U.S. PATENT DOCUMENTS

| | | | |
|---|---|---|---|
| 3,526,884 | 9/1970 | Buslik et al. | 360/133 |
| 4,084,200 | 4/1978 | Adair et al. | 360/133 |
| 4,106,066 | 8/1978 | Kudo | 360/133 |

Primary Examiner—John H. Wolff

Attorney, Agent, or Firm—Cruzan Alexander; Donald M. Sell; William L. Huebsch

[57] ABSTRACT

A cartridge for use in a disk drive machine. The cartridge includes a compression spring for biasing a plunger to a storage position against a memory disk assembly and thereby pressing the disk assembly against a housing for the cartridge to frictionally restrict its movement within the housing when the cartridge is removed from the machine. Also, the cartridge includes an access door coupled to the plunger by both a tension door spring which will bias the door to a fully closed position when the plunger is in its storage position, and a linkage which will telescope together under a compressive force to allow the tension door spring to move the door to its fully closed position, but will transmit tensile forces when parts of the linkage are engaged to move the plunger against the compression spring to a retracted position spaced from the disk assembly and permit rotation of the disk assembly when the door is opened by a disk drive machine.

3 Claims, 5 Drawing Figures

CARTRIDGE WITH IMPROVED ACCESS DOOR CLOSING MEANS

BACKGROUND OF THE INVENTION

This invention relates to the means for insuring full closure of the head access door in a cartridge for use in a disk drive machine when the door is not positioned in an open position by an external force.

Standardized cartridges, including a single memory disk assembly, are well known in the art, a typical structure for such a cartridge being that shown in U.S. Pat. No. 3,526,884. Such cartridges are adapted to be inserted in a disk drive machine used as peripheral equipment for a computer (e.g., see U.S. Pat. No. 3,800,325), which machine is adapted to engage and open an access door in a housing of the cartridge (which opening of the door releases means in the cartridge for restricting movement of the disk assembly in the cartridge) to engage a hub portion of the disk assembly and rotate the disk assembly in the housing, and to move a head in the drive unit through the access door to write or read information in a magnetizable coating on the surface of the disk assembly.

Typically the housing for such a cartridge has generally parallel circular top and bottom walls and a cylindrical edge wall between the edges of the top and bottom walls, and has an opening through the edge and top walls affording access for the head of the disk drive machine to read or write on the disk assembly. The access door for the housing includes first and second portions disposed generally at right angles to each other, with the first portion and the part of the second portion adjacent thereto being adapted to close the opening when the door is in its closed position. The second portion of the door extends across the center of the top wall of the housing and is hingedly mounted on the top wall at its end opposite the first portion to afford movement of the door between closed and open positions. The means for restricting movement of the disk assembly in the housing when the cartridge is removed from the disk drive machine includes a plunger mounted in the top wall of the housing adjacent the hub portion of the disk and under the second portion of the door for movement axially of the disk assembly, and a compression spring between the top wall and the plunger for biasing the plunger to a storage position against the disk assembly, and for thereby pressing the disk assembly into frictional engagement against the bottom wall of the cartridge. The door has a lug projecting from the second portion of the door and adapted to engage the plunger after movement of the door has begun from its closed toward its open position to move the plunger to a retracted position out of engagement with the hub portion and thereby allow rotation of the disk assembly by the disk drive machine.

Because of this linkage between the door and the plunger, the movement of the plunger toward the disk under the influence of the compression spring when the access door is allowed to close will also move the door to a semiclosed position, after which the linkage may telescope together to allow movement of the door to its fully closed position. The length of the extended linkage is not adapted to fully close the door or hold the door in its fully closed position, however, to be sure that the plunger can press the disk assembly firmly against the bottom wall of the housing without any restraining effect that could otherwise be exerted by the linkage between the door and the plunger.

Thus such prior art cartridges have included means for fully closing the access door and holding it in its fully closed position after the compression spring has moved the door to its semiclosed position. These means have included means for pivotably mounting the first portion of the door on the second portion of the door, means for biasing the first portion of the door toward the edge wall, and latching members on the first portion of the door adapted to move along cam surfaces and into detents in the edge wall of the housing to fully close the door under the influence of the biasing means after the compression spring has positioned the door in its semiclosed position (e.g., the structure shown in U.S. Pat. No. 3,526,884).

SUMMARY OF THE INVENTION

The present invention provides a cartridge of the type discussed above which has a simple and inexpensive means for fully closing the access door and for holding it in its fully closed position after the compression spring has positioned the door in its semiclosed position, which means allows the access door to have a simplified structure compared to the structure of the prior art access door described above.

In the cartridge according to the present invention the means for fully closing the access door and for holding it in its fully closed position after the compression spring has positioned the door in its semiclosed position is a tension spring between the plunger and the second portion of the door adapted to bias the door to its fully closed position after the compression spring has moved the plunger to its storage position in engagement with the disk assembly to press it against the bottom wall of the housing.

The use of such a spring allows the use of a one-piece door, thus much simplifying the structure and assembly of the cartridge.

BRIEF DESCRIPTION OF THE DRAWING

This and other advantages of the present invention will be explained with reference to the accompanying drawing where like numbers refer to like parts in the several views, and wherein.

DESCRIPTION OF THE PREFERRED EMBODIMENT

Figure 1:
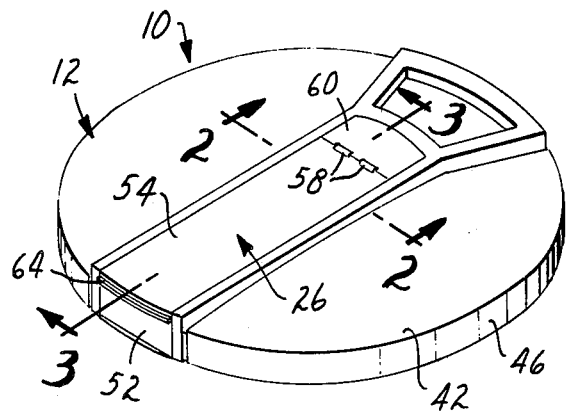
FIG. 1 is a perspective view of a cartridge according to the present invention.
Figure 2:
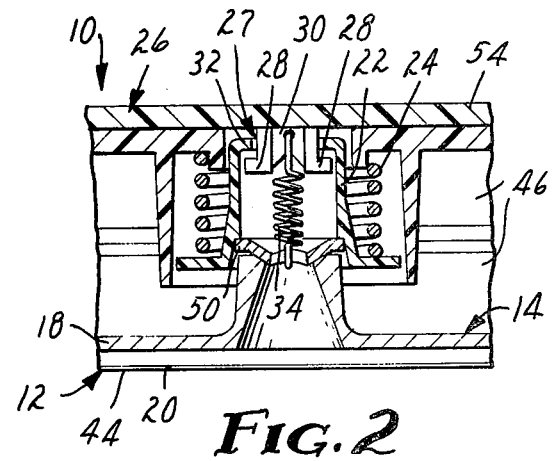
FIG. 2 is an enlarged fragmentary sectional view taken approximately along line 2—2 of FIG. 1.

Referring now to the drawing, there is shown a cartridge according to the present invention generally designated by the reference numeral 10.

Generally the cartridge 10 comprises a housing 12 enclosing a disk assembly 14 including an outer circular plate-like portion 16 having its opposite parallel surfaces coated by a magnetizable material, and a central hub portion 18 adapted to be engaged through an orifice 20 in the housing 12 by a drive mechanism in a disk drive machine with which the cartridge 10 is engaged.

The cartridge 10 includes means for restricting movement of the disk assembly 14 in the housing 12 when the cartridge 10 is removed from a disk drive machine including a compression spring 24 biasing a plunger 22 to a storage position against the disk assembly 14 and for thereby pressing the disk assembly 14 into frictional engagement against the housing 12. The compression spring 24 also provides means for biasing an access door 26 on the housing 12 to a semiclosed position via the plunger 22 and a linkage 27 between the plunger 22 and the door 26, which linkage 27 will telescope together to afford movement of the door 26 to a fully closed position, and will transmit tensile forces to pull the plunger 22 away from the disk assembly 14 to a disengaged position, which will allow rotation of the disk assembly 14 when the door 26 is moved to its open position. Also, the cartridge has means according to the present invention for biasing the door 26 to its fully closed position and telescoping the linkage 27 together when the plunger 22 is in its storage position, comprising a door spring 34 tensioned between the door 26 and the plunger 22.

Figure 3:
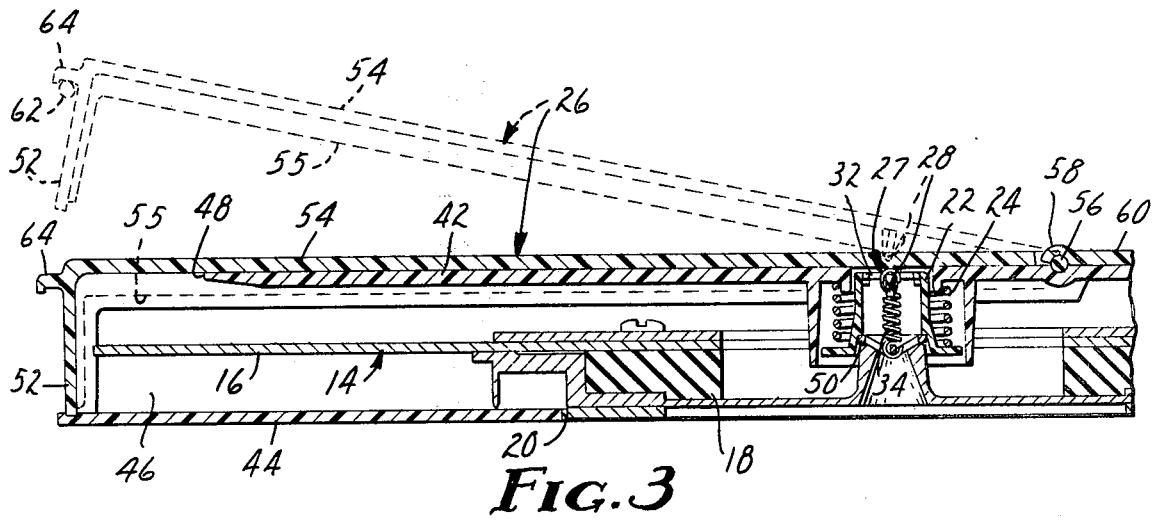
FIG. 3 is an enlarged fragmentary sectional view taken approximately along line 3—3 of FIG. 1.
Figure 4:
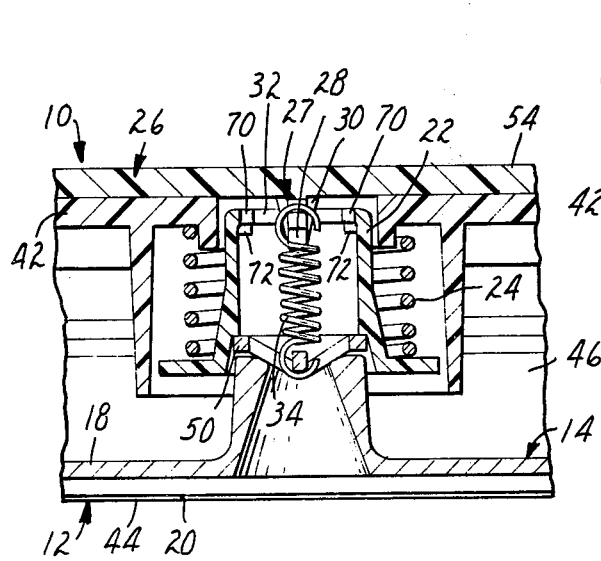
FIGS. 4 and 5 are enlarged fragmentary views taken approximately along line 3—3 of FIG. 1 and respectively showing an access door on the cartridge in a closed and an open position.
Figure 5:
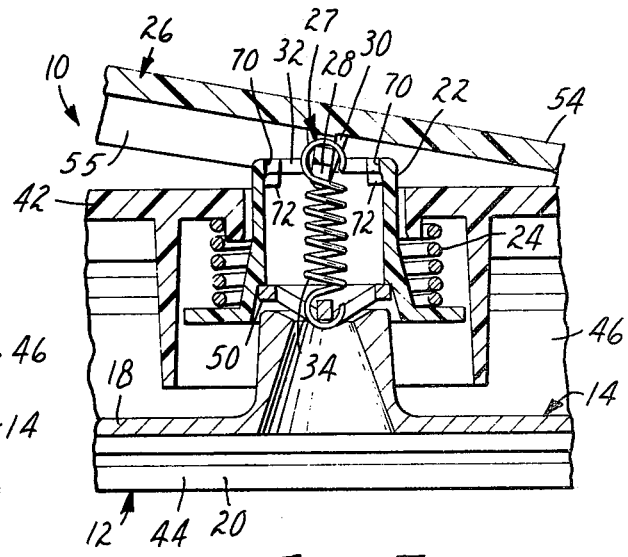

The housing 12 comprises generally parallel circular top and bottom walls 42 and 44 and a cylindrical edge wall 46 extending between the outer edges of said top and bottom walls 42 and 44, and has an opening 48 through the edge and top walls 46 and 42 affording access for a head in a disk drive into which the cartridge is inserted (not shown) to read or write on the disk assembly 14. The access door 26 is a one-piece molding including first and second portions 52 and 54 disposed generally at right angles to each other with the first portion 52 and the adjacent part of the second portion 54 being adapted to close the opening 48 when the door 26 is in its closed position. The second portion 54 extends across the center of the top wall 42, and has longitudinally-extending stiffening ribs 55 along its edges adjacent the top wall 42 which are received in grooves in the top wall 42. The second portion 54 is mounted on the top wall 42 at its end opposite the first portion 52 by a hinge to afford movement of the door 26 from its closed to its open position. The hinge comprises spaced axially-aligned hinge pins 56 (FIG. 3) formed integrally with the door 26, and spaced arcuate hook-like portions 58 of a plate 60 fastened to the top wall 42 of the housing 12. The portions 58 retain the hinge pins 56 against semicylindrical bearing surfaces on the top wall 42 of the housing 12, and are received in openings in the door 26 adjacent the hinge pins 56 when the door 26 is moved to its open position.

The plunger 22 included in the means for restricting movement of the disk assembly 14 is mounted in a central opening in the top wall 42 of the housing 12 adjacent to the hub portion 18 of the disk assembly 14 for movement axially of the disk assembly 14. The compression spring 24 is positioned between the top wall 42 of the housing 12 and an outwardly-projecting flange on the plunger 22 so that it will press a generally conical outer surface on a separable disk-like portion 50 of the plunger 22 against a mating surface centered at the upper end of the disk hub portion 18 at the storage position of the plunger 22 and thereby press the disk assembly 14 into frictional engagement against the bottom wall 44 of the cartridge 10 to restrict its movement within the housing 12 when the door 26 is not maintained in an open position by an external force such as may be provided by a disk drive machine.

The linkage 27 between the plunger 22 and the door 26 comprises a lug 30 projecting from the second portion 54 of the door 26, extending through an opening in the end of the plunger 22 adjacent the door 26, and having opposite outwardly-extending projections 28 positioned to engage the side opposite the door 26 of an inwardly-extending annular ring 32 at the end of the plunger 22 adjacent the door 26. The lug 30 and the plunger 22 are telescoped together with the projections 28 spaced from the ring 32 when the door 26 is in its fully closed position, which insures that the closed door 26 will not restrict movement of the plunger 22 to its storage position under the influence of the compression spring 24. As an example, the spacing between the adjacent surfaces of the projections 28 and the ring 32 may be 0.1 centimeter (0.040 inch) when the door 26 is fully closed. The projections 28 and ring 32, however, will engage and transfer tensile forces to move the plunger 22 away from the hub portion 18 to its retracted position and afford rotation of the disk assembly 14 by a disk drive machine during movement of the door 26 to its open position. Also, engagement of the projections 28 and ring 32 will pull the door 26 to its semiclosed position when the plunger 22 moves to its storage position under the influence of the compression spring 24. The length of the linkage 27 when the projections 28 and ring 32 are in contact, however, prevents movement of the plunger 22 to its storage position from fully closing the door 26. Telescoping of the linkage 27 and complete movement of the door 26 to its closed position is insured, however, by the door spring 34 tensioned between lug 30 and the disk-like portion 50 of the plunger 22.

Upon initial movement of the door 26 from its closed to its open position (which is typically done by engagement of a wire loop 62 on a disk drive under a lip 64 projecting outwardly from the edge of the door 26), the door spring 34 (which has a substantially lower spring rate than the compression spring 24) extends until the projections 28 engage the ring 32 on the plunger 22. Thereafter the door 26 via the projections 28 will lift the plunger 22 against the bias of the compression spring 24, and move it away from the disk assembly 14 until the door 26 reaches its open position. Subsequently when the door 26 is allowed to close the compression spring 24 will move the plunger 22 to both move the disk assembly 14 toward the bottom wall 44 of the dartridge 10 and move the door 26 toward its closed position until the plunger 22 reaches its storage position where the compression spring 24 firmly presses the disk assembly 14 against the bottom wall 44 through the plunger 22, whereupon the door spring 34 will pull the door the remaining distance to its fully closed position and hold it there.

To assemble the cartridge 10, a workman first positions the door 26 on the top cover 42 and pivotably attaches it there by attaching the plate 60 to the top cover 42 as by an adhesive. The compression spring 24 is then positioned around the plunger 22 on its outwardly-projecting flange with the conical portion 50 of the plunger 22 removed. The workman then holds the door 26 in its closed position and positions the plunger 22 through the opening in the top cover 42 with the end of the compression spring 24 opposite the flange on the plunger 22 against the inside surface of the top cover 42, and the projections 28 on the lug 30 aligned with a transverse slot 70 through the ring 32 at the end of the plunger 22. He presses the plunger 22 toward the top cover 42 until the lugs 28 pass both through the slot 70 in the ring 32 and past some inwardly-projecting protuberances 72 adjacent the slot. The workman then rotates the plunger 22 to position the projections 28 under the ring 32 between the protuberances 72 which restrict subsequent unwanted movement of the projections 28 back into alignment with the slot 70. The workman then hooks one end of the tension door spring 34 on the lug 30, positions the conical portion 50 of the plunger 22 in place, engages the adjacent end of the door spring 34 via a hook inserted through an opening in the conical portion 50, pulls the door spring 34 through that opening and engages it with the conical portion 50. The disk assembly 14 is then positioned in the housing 12 and its bottom cover 44 is attached as by screws to complete the assembly.

I claim:

1. In a cartridge adapted to be received in a disk drive machine, said cartridge comprising a disk assembly including an outer portion coated with magnetizable material and a central hub portion, a housing around the disk assembly having generally parallel circular top and bottom walls, a cylindrical edge wall between the edges of said top and bottom wall, an opening in said edge and top walls affording access of a head in a said disk drive machine to read or write on the magnetizable coating of the disk assembly, an access door having first and second portions disposed generally at right angles to each other with the first portion and the adjacent part of the second portion adapted to close said opening when the door is in a closed position, and the second portion extending across the top surface of said housing past the axis of said disk assembly, means for mounting said door on said housing at the end of said second portion opposite said first portion for movement between a fully closed position over said opening and an open position with said door spaced from the opening, a plunger mounted in said top wall adjacent said hub portion for movement axially of said disk assembly, a compression spring located between and having opposite ends contacting said housing and said plunger respectively for biasing said plunger to a storage position against said hub portion to press said disk assembly against said bottom wall, means providing a linkage between said door and said plunger for moving said plunger to a retracted position spaced from said disk assembly when said door is opened, for moving said door to a semiclosed position upon movement of said plunger to its storage position and for affording movement of said door from its semiclosed to its fully closed position when said plunger is in its storage position, and means for moving said door from its semiclosed to its fully closed position when said plunger is in its storage position, the improvement wherein said door is a one-piece molding and said means for moving said door from its semiclosed to its fully closed position is a door spring with a lower spring constant than said compression spring tensioned between said plunger and said door.

2. A cartridge according to claim 1 wherein said means providing a linkage comprises a lug on said top cover having opposite outwardly-extending projections, said plunger is hollow and has an inwardly-extending ring defining an opening on its end adjacent said door, which ring has a transverse slot adapted to receive said projections, said lug extends through said opening with said projections positioned to engage the surface of said ring opposite said door, said lug can move through said opening to separate said projections and said ring to afford movement of said door from its semiclosed to its closed position, said plunger includes a removable disk-like portion at its end opposite said ring adapted to engage said hub portion of the disk assembly, and said door spring is tensioned between said lug and said disk-like portion centrally of said plunger.

3. A cartridge according to claim 1 wherein the means for mounting said door on said housing comprises a hinge member affixed to said door and a hinge member affixed to said housing, one of said hinge members being spaced axially aligned pins, and the other being spaced arcuate hook-like members engaging said pins to afford rotation of said pins within said hook-like members.

* * * * *